United States Patent
Nishimori et al.

(10) Patent No.: US 9,557,631 B2
(45) Date of Patent: Jan. 31, 2017

(54) LIGHT SOURCE UNIT AND IMAGE PROJECTION APPARATUS INCLUDING LIGHT SOURCE UNIT

(71) Applicants: Takehiro Nishimori, Kanagawa (JP); Kazuhiro Fujita, Tokyo (JP); Toshiharu Murai, Kanagawa (JP); Ikuo Maeda, Kanagawa (JP); Tatsuya Takahashi, Tokyo (JP)

(72) Inventors: Takehiro Nishimori, Kanagawa (JP); Kazuhiro Fujita, Tokyo (JP); Toshiharu Murai, Kanagawa (JP); Ikuo Maeda, Kanagawa (JP); Tatsuya Takahashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 84 days.

(21) Appl. No.: 14/158,933

(22) Filed: Jan. 20, 2014

(65) Prior Publication Data

US 2014/0240680 A1     Aug. 28, 2014

(30) Foreign Application Priority Data

Feb. 26, 2013  (JP) ................. 2013-035403

(51) Int. Cl.
  *G03B 21/16*   (2006.01)
  *F21V 15/01*   (2006.01)
  (Continued)

(52) U.S. Cl.
  CPC ............... *G03B 21/16* (2013.01); *F21V 7/00* (2013.01); *G03B 21/208* (2013.01);
  (Continued)

(58) Field of Classification Search
  CPC ... G03B 21/16; G03B 21/208; G03B 21/2013; G03B 21/2033; G03B 21/2066; G03B 21/145; F21V 7/00; F21V 29/02; F21V 29/00; F21V 29/60; F21V 29/40; F21V 29/025; F21V 29/673; F21V 7/0008; F21V 7/0033; F21V 7/041; H01S 5/024; H04N 9/3144
  (Continued)

(56) References Cited

U.S. PATENT DOCUMENTS 6,007,205 A * 12/1999 Fujimori ................. 353/57
2002/0114158 A1   8/2002 Chuang
(Continued)

FOREIGN PATENT DOCUMENTS

CN    1645249 A    7/2005
CN    102053467 A    5/2011
(Continued)

OTHER PUBLICATIONS

International Search Report and Written Opinion dated Aug. 1, 2014.
(Continued)

*Primary Examiner* — Bao-Luan Le
*Assistant Examiner* — Christopher Lamb, II
(74) *Attorney, Agent, or Firm* — Harness, Dickey & Pierce, P.L.C.

(57) ABSTRACT

A light source unit includes a light emitting element supporter to support a plurality of light emitting elements disposed with a dispersed pattern in a two-dimensional direction as a light emitting element assembly, and light emitted from the light emitting element assembly exits to a target; a light return member disposed at a position facing a light emitting side of the light emitting element assembly while setting a space with the light emitting element supporter, the light return member returning light emitted from the light emitting element assembly toward at an inner side of two dimensional direction of the light emitting element
(Continued)

assembly, and a flow path of the cooling air to pass through cooling air supplied from an air supply unit into the space.

12 Claims, 15 Drawing Sheets

(51) Int. Cl.
    *F21V 29/02* (2006.01)
    *F21V 7/00* (2006.01)
    *G03B 21/20* (2006.01)

(52) U.S. Cl.
    CPC ..... *G03B 21/2013* (2013.01); *G03B 21/2033* (2013.01); *G03B 21/2066* (2013.01)

(58) Field of Classification Search
    USPC .... 353/52, 57, 61, 60; 362/264, 249.01, 235
    See application file for complete search history.

(56) References Cited

U.S. PATENT DOCUMENTS

| | | | |
|---|---|---|---|
| 2002/0191395 A1* | 12/2002 | Fleury | F21V 13/12 362/236 |
| 2004/0090602 A1 | 5/2004 | Imade | |
| 2005/0162618 A1 | 7/2005 | Morita et al. | |
| 2005/0201107 A1* | 9/2005 | Seki | 362/373 |
| 2006/0152691 A1 | 7/2006 | Imade | |
| 2006/0209543 A1* | 9/2006 | Taguchi | G03B 21/16 362/253 |
| 2006/0244931 A1 | 11/2006 | Imade | |
| 2007/0109501 A1 | 5/2007 | Imade | |
| 2007/0121086 A1 | 5/2007 | Imade | |
| 2007/0229773 A1* | 10/2007 | Suzuki | 353/52 |
| 2008/0170015 A1 | 7/2008 | Kise et al. | |
| 2010/0053560 A1* | 3/2010 | Segler | G03B 21/00 353/31 |
| 2010/0118530 A1* | 5/2010 | Nagai | H01L 25/0753 362/235 |
| 2010/0149494 A1* | 6/2010 | Kawachi et al. | 353/57 |
| 2010/0244700 A1* | 9/2010 | Chong | G01N 21/255 315/113 |
| 2010/0259935 A1* | 10/2010 | Scordino | F21K 9/00 362/294 |
| 2010/0309441 A1* | 12/2010 | Wang | H04N 9/3144 353/61 |
| 2011/0032491 A1* | 2/2011 | Tsai | F21V 29/02 353/61 |
| 2011/0096296 A1* | 4/2011 | Ogawa | 353/31 |
| 2012/0320355 A1 | 12/2012 | Maeda | |
| 2013/0113812 A1 | 5/2013 | Iwama | |
| 2013/0308104 A1 | 11/2013 | Nishimori et al. | |

FOREIGN PATENT DOCUMENTS

| | | |
|---|---|---|
| CN | 102841494 A | 12/2012 |
| EP | 1413919 A1 | 4/2004 |
| EP | 1538274 A1 | 6/2005 |
| EP | 2390564 A2 | 11/2011 |
| JP | 3102988 U | 7/2004 |
| JP | 2006-253274 A | 9/2006 |
| JP | 2008-026793 | 2/2008 |
| JP | 2009-181098 | 8/2009 |
| JP | 2009-186701 | 8/2009 |
| JP | 2010048885 A | 3/2010 |
| JP | 2011-197593 | 10/2011 |
| JP | 2011249304 A | 12/2011 |
| JP | 2013-101207 | 5/2013 |
| WO | WO-2006027621 A2 | 3/2006 |

OTHER PUBLICATIONS

Office Action for corresponding Chinese Patent Application No. 201410046082.3 issued on Jun. 3, 2015.

* cited by examiner

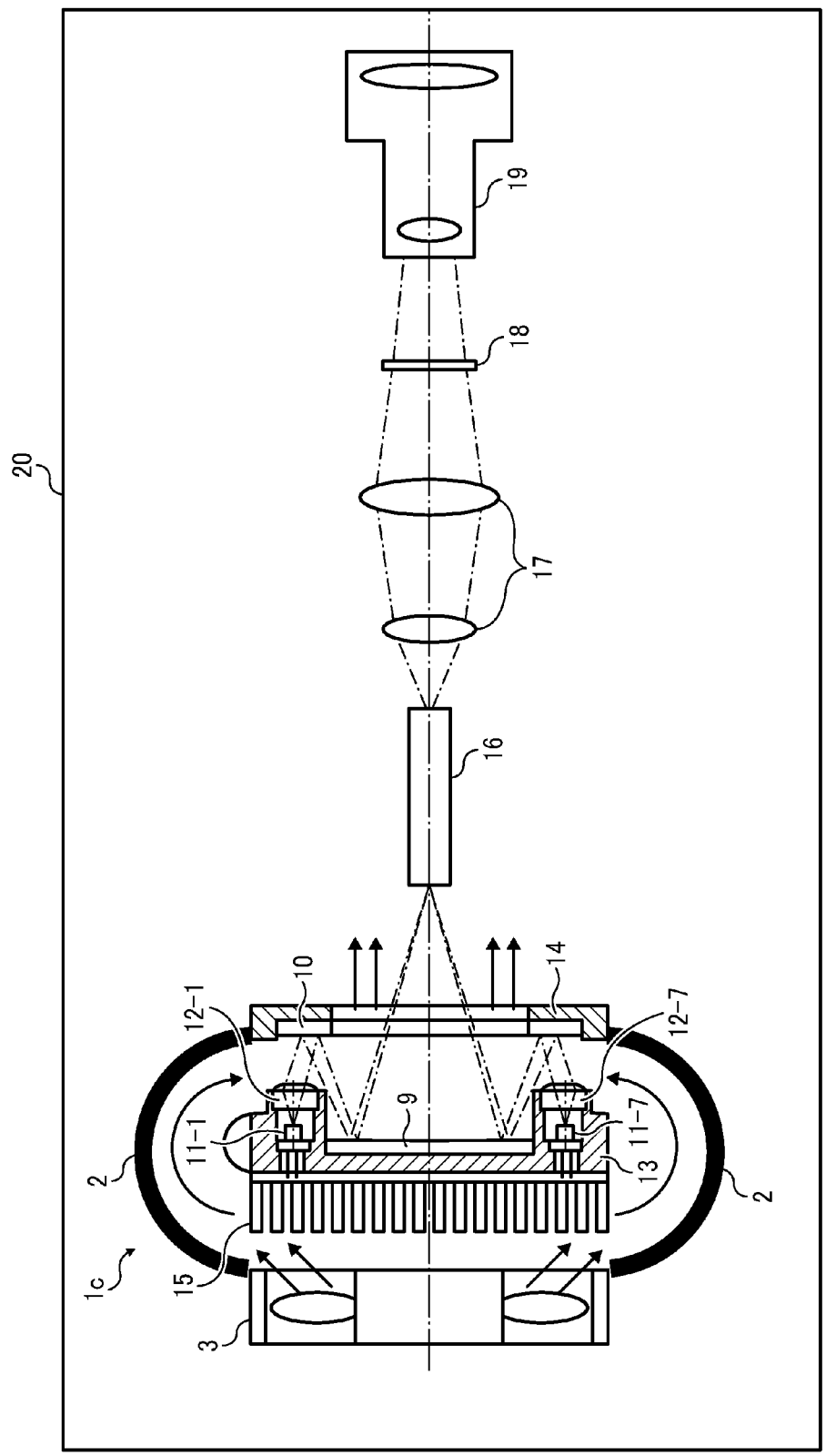

LIGHT SOURCE UNIT AND IMAGE PROJECTION APPARATUS INCLUDING LIGHT SOURCE UNIT

This application claims priority pursuant to 35 U.S.C. §119 to Japanese Patent Application No. 2013-035403, filed on Feb. 26, 2013 in the Japan Patent Office, the disclosures of which is incorporated by reference herein in their entirety.

BACKGROUND

1. Technical Field

The present invention relates to a light source unit and image projection apparatus to emit light to a target.

2. Background Art

Screen images of personal computers, video images, and image data stored in memory cards can be transmitted to image projection apparatuses known as projectors that can project images onto a screen. In the projector, light emitted from a light source is focused on a micro mirror display device known as a digital micro mirror device (DMD), or a liquid crystal plate, and then images are displayed as images such as color images on the screen.

In the projector, a high intensity discharge lamp is conventionally used as the light source, but other light sources have been developed. For example, as a light emitting element for light source units, semiconductor elements such as a light emitting diode (LED), a laser diode (LD), or organic electroluminescence (OEL) have been developed as the light source. The laser diode can be used as the light source for the image projection apparatuses to enhance, for example, color reproduction performance, light emission efficiency, and light use efficiency. Further, because the laser diode is a point light source or projects parallel beams, a lighting system can be designed easily, color lights can be synthesized using a simple configuration, and a projection lens having a small numerical aperture (NA) can be used.

When the light emitting element such as the laser diode (LD) is employed as the light source for the image projection apparatuses, light quantity of one single light emitting element is not enough for light quantity required for the image projection apparatuses.

In view of such issue, a semiconductor light source apparatus of JP-2011-197593-A is devised, in which a number of light emitting elements are packed two dimensionally on a plane, and light quantity required for an image projection apparatus can be obtained by adding light quantity of a number of light emitting elements. In this semiconductor light source apparatus, a number of light emitting elements are supported by a light emitting element supporter in a matrix pattern while setting the light axis of each of semiconductor light emitting elements is substantially parallel to each other. Light emitted from the semiconductor light emitting elements are condensed by using a collimator lens retained at a lens holder of each of the semiconductor light emitting elements to obtain light quantity required for the image projection apparatus.

As for image projection apparatuses using a light emitting element assembly arranging a number of light emitting elements with a dispersed pattern on two dimensional direction as a light source, efficient cooling of the light emitting elements becomes an issue because if the cooling is not enough, light emitting quantity may not be stabilized, and lifetime of the light emitting elements becomes short.

The light emitting element assembly can be cooled by disposing a heat dissipater such as a heat sink on a rear side of a light emitting element supporter that supports the light emitting element assembly, in which air is supplied to the heat dissipater to cool the light emitting element assembly using a cooling fan.

However, cooling effect may not be enough just by cooling the rear side of the light emitting element supporter. Especially, when a large number of light emitting elements are densely disposed on a plane to achieve a small-sized light source, or when a large number of light emitting elements are used to increase light quantity, cooling effect may not be enough.

SUMMARY

In one aspect of the present invention, a light source unit is devised. The light source unit includes a light emitting element supporter to support a plurality of light emitting elements disposed with a dispersed pattern in a two-dimensional direction as a light emitting element assembly, light emitted from the light emitting element assembly exiting to a target; a light return member disposed at a position facing a light emitting side of the light emitting element assembly while setting a space with the light emitting element supporter, the light return member returning light emitted from the light emitting element assembly toward at an inner side of two dimensional direction of the light emitting element assembly, and a flow path of the cooling air to pass through cooling air supplied from an air supply unit into the space.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 16 is a schematic configuration of a projector according to an example embodiment.

Figure 1:
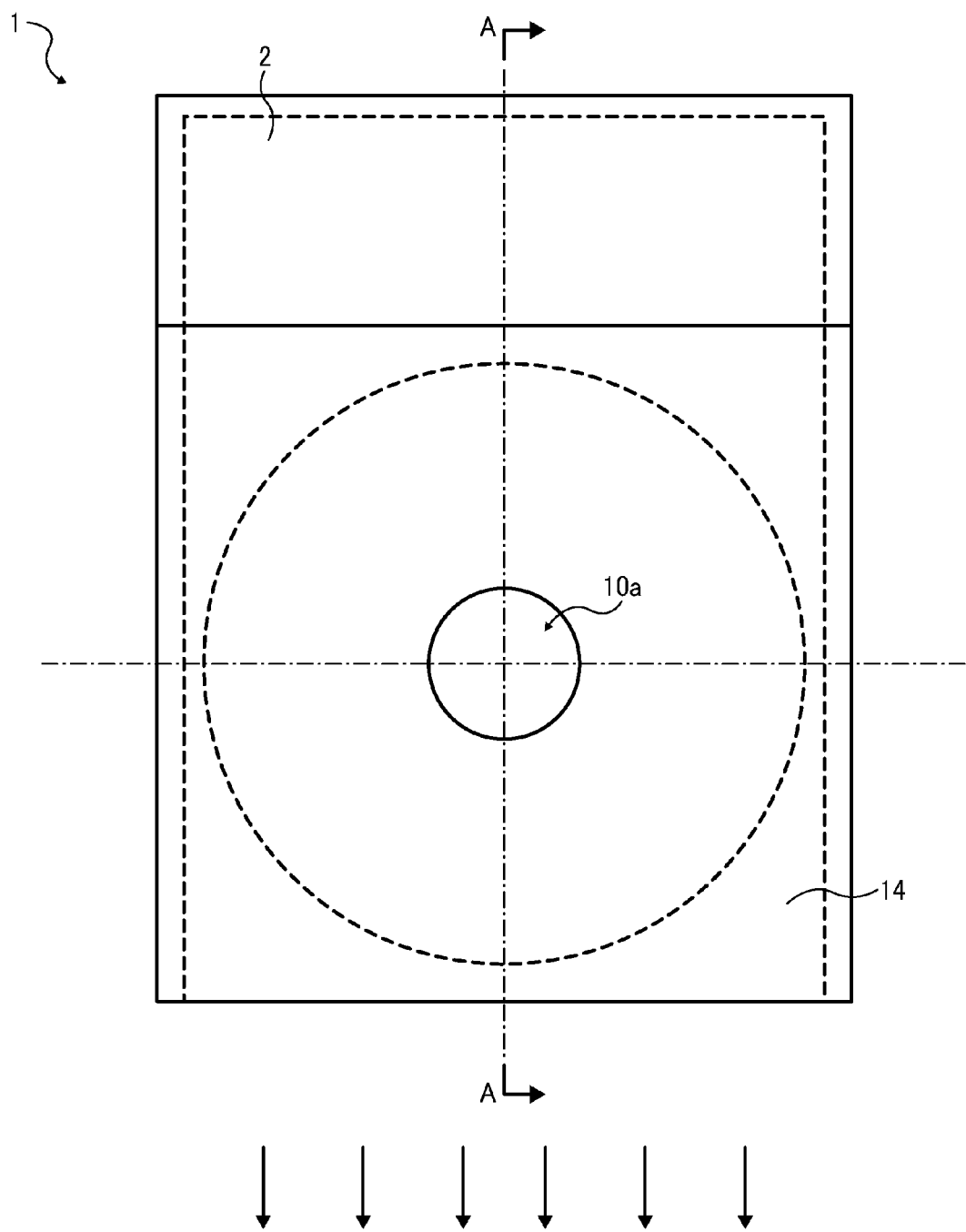
FIG. 1 is a schematic front view of a light source unit according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, apparatuses or systems according to example embodiments are described hereinafter.

First Example Embodiment

A description is given of a first example embodiment of a light source unit employable for an image projection apparatus such as a projector (hereinafter, first example embodiment). In this specification, the light source unit can be also referred to as the light source apparatus.

Figure 2:
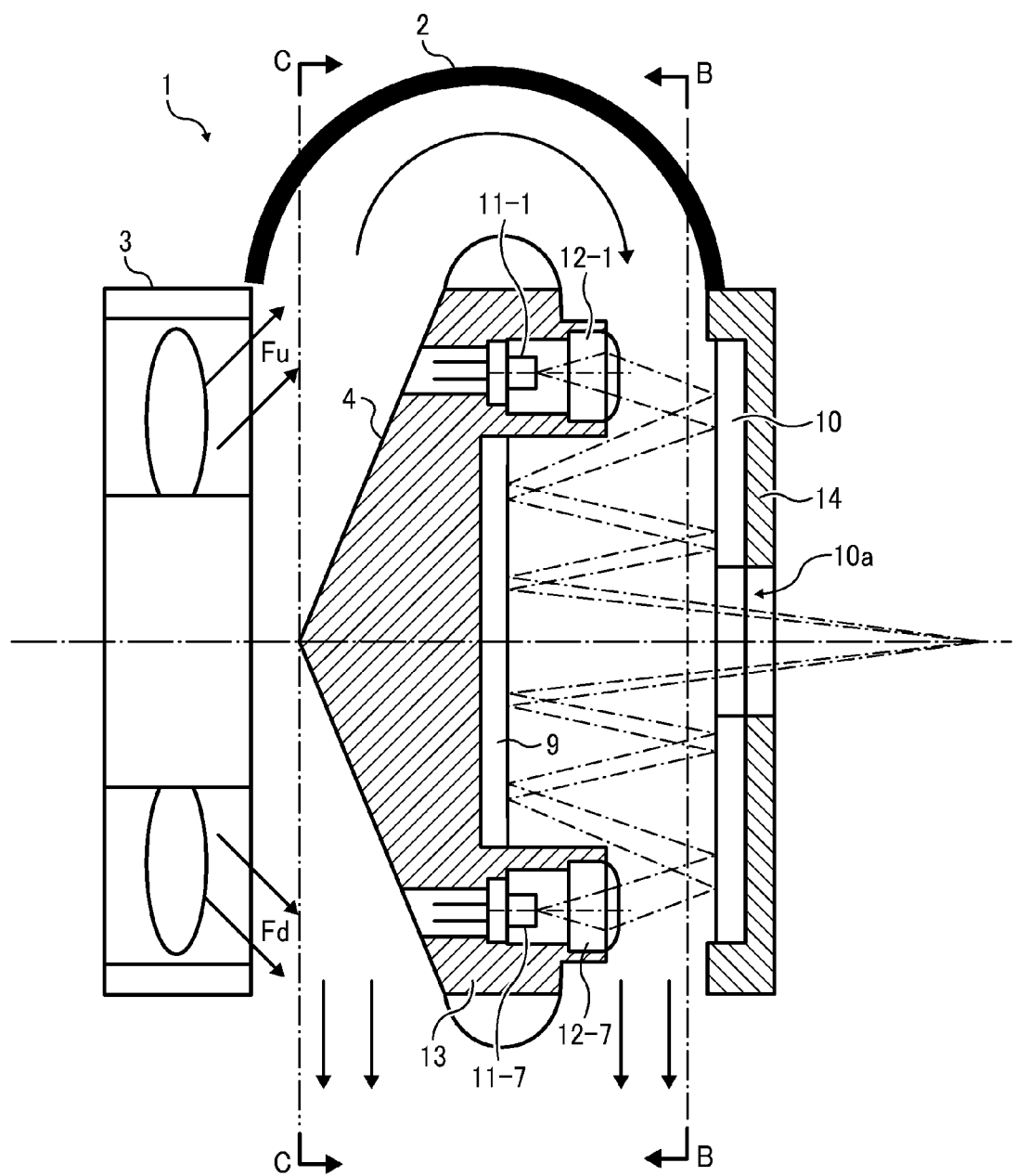
FIG. 2 is a schematic cross-sectional view of the light source unit of FIG. 1 cut at a line A-A in FIG. 1.
Figure 3:
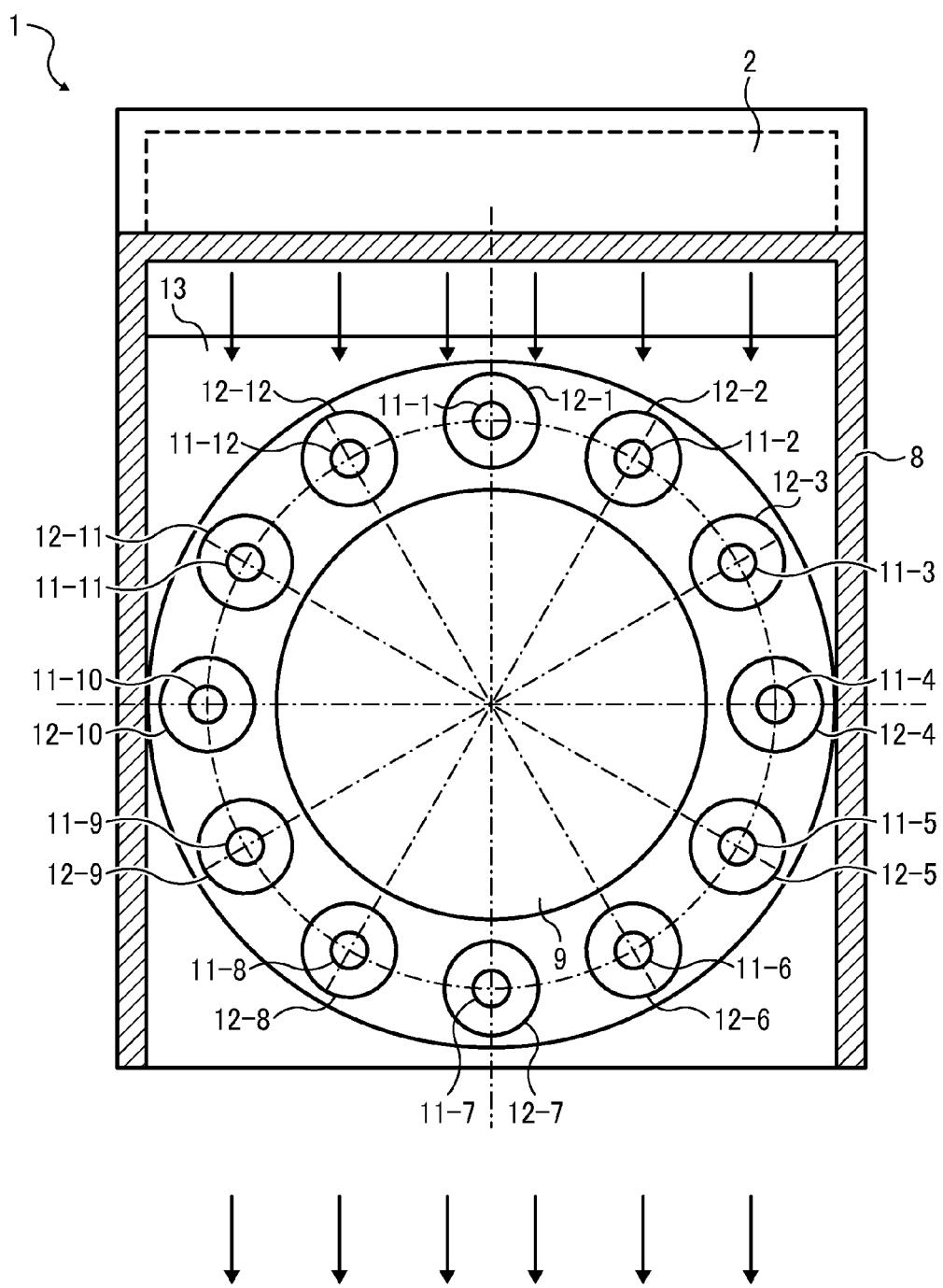
FIG. 3 is a schematic cross-sectional view of the light source unit of FIG. 1 cut at a line B-B in FIG. 2.
Figure 4:
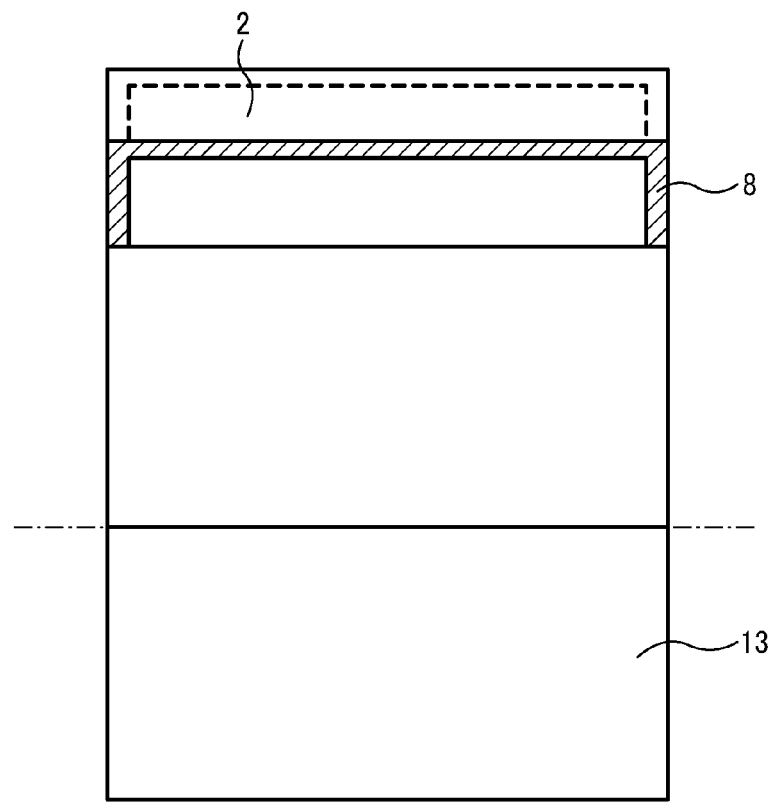
FIG. 4 is a schematic cross-sectional view of the light source unit of FIG. 1 cut at a line C-C in FIG. 2.

FIG. 1 is a schematic front view of the light source unit 1 useable as a light source apparatus of the first example embodiment. FIG. 2 is a schematic cross-sectional view of the light source unit 1 cut at a line A-A in FIG. 1. FIG. 3 is a schematic cross-sectional view of the light source unit 1 cut at a line B-B in FIG. 2. FIG. 4 is a schematic cross-sectional view of the light source unit 1 cut at a line C-C in FIG. 2.

The light source unit 1 of the first example embodiment includes a plurality of light sources 11-1 to 11-12 (12 light sources in the first example embodiment), which is arranged into the two dimensional direction with a dispersed pattern, and the light sources 11-1 to 11-12 can be used as light source assembly or light emitting element assembly. Each of the light sources 11-1 to 11-12 is corresponded to each of coupling lenses 12-1 to 12-12, and the light sources 11-1 to 11-12 and the coupling lenses 12-1 to 12-12 are arranged in a circle pattern two dimensionally on a light source supporter 13 used as a light emitting element supporter.

Further, as shown in FIG. 2, an axial flow fan 3 used as an air supply unit can be disposed at a rear side of the light source supporter 13, which is a side opposite to a light emitting side (hereinafter, front side) of the light sources 11-1 to 11-12.

The light sources 11-1 to 11-12 are, for example, laser light sources such as semiconductor lasers, and the color of light emitted from each of the light sources 11-1 to 11-12 may be the same or different.

Figure 5:
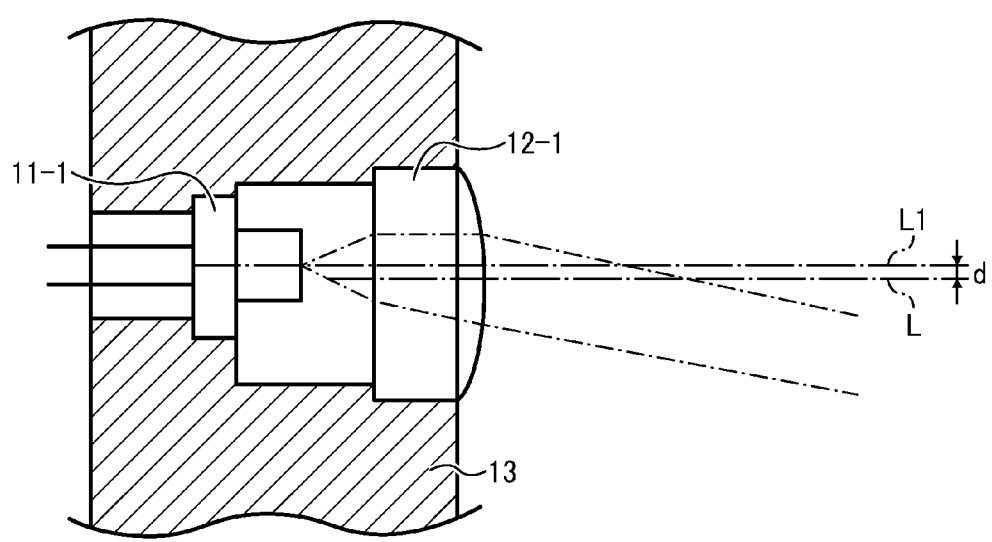
FIG. 5 shows a positional relationship of a light source and a coupling lens in the light source unit of FIG. 1.

Each of the coupling lenses 12-1 to 12-12 is, for example, a convex lens made of glass or plastic material. As shown in FIG. 5, a curvature center axis L of each of the coupling lenses 12-1 to 12-12 can be offset with respect to an optical axis L1 of each of the light sources 11-1 to 11-12 toward the inner circumferential direction so that an axis deviation "d" is set between the curvature center axis L and the optical axis L1.

By arranging the light sources 11-1 to 11-12 and the coupling lenses 12-1 to 12-12 in this configuration, light emitted from each of the light sources 11-1 to 11-12 passes through the corresponding coupling lenses 12-1 to 12-12 while a direction of the exiting light is angled toward the center of the circle ring pattern, with which the lights emitted from the light sources 11-1 to 11-12 can be formed as an exit light.

The light source supporter 13 can be made of, for example, metal such as aluminum, or a mold resin. As shown in FIG. 2, the light source supporter 13 supports a first reflection mirror 9 used as a light guide member to guide light that has entered the first reflection mirror 9 to a light exiting direction of the light source unit 1. The light source supporter 13 supports the first reflection mirror 9 at an inner side of the light sources 11-1 to 11-12 arranged in the circle pattern two dimensionally.

Further, the light source unit 1 includes a second reflection mirror 10 used as a light guide member to guide light emitted from the light sources 11-1 to 11-12, arranged in the circle pattern two dimensionally, to the first reflection mirror 9. The light emitted from the light sources 11-1 to 11-12 passes the respective coupling lenses 12-1 to 12-12, and then reflects on the second reflection mirror 10 as a reflection light, and then the reflection light enters the first reflection mirror 9. The light that enters the first reflection mirror 9 reflects on the first reflection mirror 9, and then exits from the light source unit 1.

The first reflection mirror 9 is, for example, a disc-like plate supported by the light source supporter 13, wherein the first reflection mirror 9 is supported at a surface of light source supporter 13, which is at an inner side of the light sources 11-1 to 11-12 arranged in the circle pattern two dimensionally. The first reflection mirror 9 may be, for example, a disc-like glass plate, in which one face of the plate is deposited with, for example, an aluminum layer to form a reflection face used as a reflection portion.

The second reflection mirror 10 is, for example, a ring plate supported by a mirror supporter 14 supported by an edge of a unit side wall 8, wherein the unit side wall 8 is provided to enclose the light source supporter 13, and the light sources 11-1 to 11-12 arranged in the circle pattern two dimensionally as shown in FIG. 3. The unit side wall 8 and the mirror supporter 14 can be made of, for example, metal such as aluminum, or a mold resin similar to the light source supporter 13.

The second reflection mirror 10 is disposed at a position to reflect the light emitted from each of light sources 11-1 to 11-12 to the first reflection mirror 9 disposed at a position corresponding to the inner side of the light sources 11-1 to 11-12 arranged in the circle pattern. The second reflection mirror 10 may be, for example, a ring glass plate, in which one face of the plate is deposited with, for example, an aluminum layer to form a reflection face used as a reflection portion.

The center portion of the second reflection mirror 10 is used a light exit port 10*a* for exiting light reflected at the first reflection mirror 9 from the light source unit 1. Therefore, the center portion of the second reflection mirror 10 is formed, for example, as an opening to pass through light, or is formed as a translucent member such as glass not deposited with an aluminum layer.

The light emitted from the light sources 11-1 to 11-12 and passing through the coupling lenses 12-1 to 12-12 is reflected at the second reflection mirror 10, and then reflected by the first reflection mirror 9 disposed at the inner side of the light sources 11-1 to 11-12 arranged in the circle pattern, and then the light exits from the light source unit 1.

In the first example embodiment, the light is reflected by the first reflection mirror 9 and the second reflection mirror 10 for several times, and then the light exits from the light exit port 10*a* formed at the center portion of the second reflection mirror 10. By repeating this light reflection, the cross section area of the light flux emitted from the light sources 11-1 to 11-12 can be decreased gradually, with which density increased light flux can exit from the light source unit 1. Further, by reducing the cross section area of the light flux exiting from the light source unit 1, a light focus distance of the exiting light beam flux can be shortened, with which a projector including the light source unit 1 can be compact in size in the light exiting direction of the light source unit 1.

In the first example embodiment, the number of reflection times of light at the second reflection mirror 10 is two times and the number of reflection times of light at the first reflection mirror 9 is two times, and then the light exits from the light source unit 1 in the light exiting direction. However, the number of reflection times of light can be one time or more. The greater the number of reflection times of light, the smaller the cross section area of the light flux exiting from the light source unit 1.

Further, a component of the light-return device to reflect the light emitted from the light sources 11-1 to 11-12 to the first reflection mirror 9 disposed at the inner side of the light sources 11-1 to 11-12 is not limited to a mirror such as the second reflection mirror 10 that reflects light to change a light path, but can be other light path changing member that refracts light to change a light path. Further, a component of the light guide member to guide the light to the light exiting direction of the light source unit 1 is not limited to a mirror such as the first reflection mirror 9, but can be other light path changing member that refracts light to change a light path.

As shown in FIG. 2, a flow path of cooling air is formed in the light source unit 1 of the first example embodiment so that cooling air supplied by the axial flow fan 3 can pass through a space between the light source supporter 13 and the second reflection mirror 10. Specifically, in the first example embodiment, a roundabout flow path (see a rounded arrow in FIG. 2) is formed by a flow path defining member 2 at a side of the light source supporter 13 (e.g., upper side in FIG. 2) to flow cooling air Fu (see FIG. 2) from the axial flow fan 3 to the front side of the light source supporter 13 through the side of the light source supporter 13. With this configuration, cooling air blown to the rear face of the light source supporter 13 from the axial flow fan 3 flows along the rear face of the light source supporter 13, and then flows through the roundabout flow path disposed at the side of the light source supporter 13, and then the cooling air is supplied to the front side of the light source supporter 13.

In the first example embodiment, a shape of the rear face of the light source supporter 13 blown with the cooling air from the axial flow fan 3 is formed as slanted shape (e.g., slanted to upper and lower sides in FIG. 2) to decrease gas flow resistance, in which a cross-sectional shape of the light source supporter 13 may become a slanted shape 4 such as wedge shape. With this configuration, a decrease of flow rate of the cooling air flowing along the rear face of the light source supporter 13 can be suppressed. In the first example embodiment, cooling air Fd flowing in the light source supporter 13 toward the lower side in FIG. 2 takes heat from the rear face of the light source supporter 13 and then ejects outside the light source unit 1.

Further, the cooling air Fu flowing in the light source supporter 13 toward the upper side in FIG. 2 takes heat from the rear face of the light source supporter 13 and then flows to the roundabout flow path. Then, the cooling air flows to the front side of the light source supporter 13 via the roundabout flow path, and flows in a space between the front side of the light source supporter 13 and the second reflection mirror 10. The cooling air that has passed through this space is ejected outside of the light source unit 1 from other end side of the light source supporter 13, which is a lower side in FIG. 2 and opposite of the low path defining member 2.

In the first example embodiment, cooling air supplied from the axial flow fan 3 is blown to the rear face of the light source supporter 13 directly to take a part of heat transmitted to the light source supporter 13 from the light sources 11-1 to 11-12. After flowing to the front side of the light source supporter 13, the cooling air pushes warm air (thermal fluid), warmed in the space between the front side of the light source supporter 13 and the second reflection mirror 10 by natural convection circulation of heat from the light sources 11-1 to 11-12 and the light source supporter 13, to eject the warm air (thermal fluid) outside the light source unit 1.

As such, in the first example embodiment, the front and rear sides of the light source supporter 13 can be cooled by the cooling air. Therefore, compared to a configuration that cools only the rear side of the light source supporter 13 or a configuration that cools only the front side of the light source supporter 13, the light sources 11-1 to 11-12 can be cooled efficiently in the first example embodiment. As such, in the first example embodiment, the front and rear sides of the light source supporter 13 can be cooled using one fan such as the axial flow fan 3.

Further, in the first example embodiment, the warm air (thermal fluid) warmed in the space between the front side of the light source supporter 13 and the second reflection mirror 10 can be ejected from the light source unit 1 using the cooling air. Therefore, temperature increase of the second reflection mirror 10 by the warm air can be suppressed and optical properties change of the second reflection mirror 10 due to heat can be suppressed. Further, temperature increase of the first reflection mirror 9 by the warm air can be suppressed and optical properties change of the first reflection mirror 9 due to heat can be suppressed.

In the first example embodiment, a size of the light source supporter 13, a diameter of circle pattern defined by the light sources 11-1 to 11-12 can be set to any values at discretion, and then the number of light sources can be set to a suitable number. Further, by increasing heat quantity of the light source supporter 13, heat dissipation performance can be enhanced.

Because the light source unit 1 of the first example embodiment can devise an enhanced cooling performance of the light sources 11-1 to 11-12, light emitting quantity of the light sources 11-1 to 11-12 can be stabilized and lifetime of the light sources 11-1 to 11-12 can be enhanced, and further, because the freedom of design can be broader, the light source unit 1 can be applied to various needs and applications. For example, the light source unit of the first example embodiment can be applied to an image projection apparatus such as a projector.

Second Example Embodiment

A description is given of a second example embodiment of a light source unit. A light source unit 1a of the second example embodiment has a configuration almost same as the light source unit 1 of the above first example embodiment, but compared to the light source unit 1 of the first example embodiment, a flow path for cooling air is different. A description is given of a different point of the light source unit 1a of the second example embodiment compared to the light source unit 1 of the first example embodiment.

Figure 6:
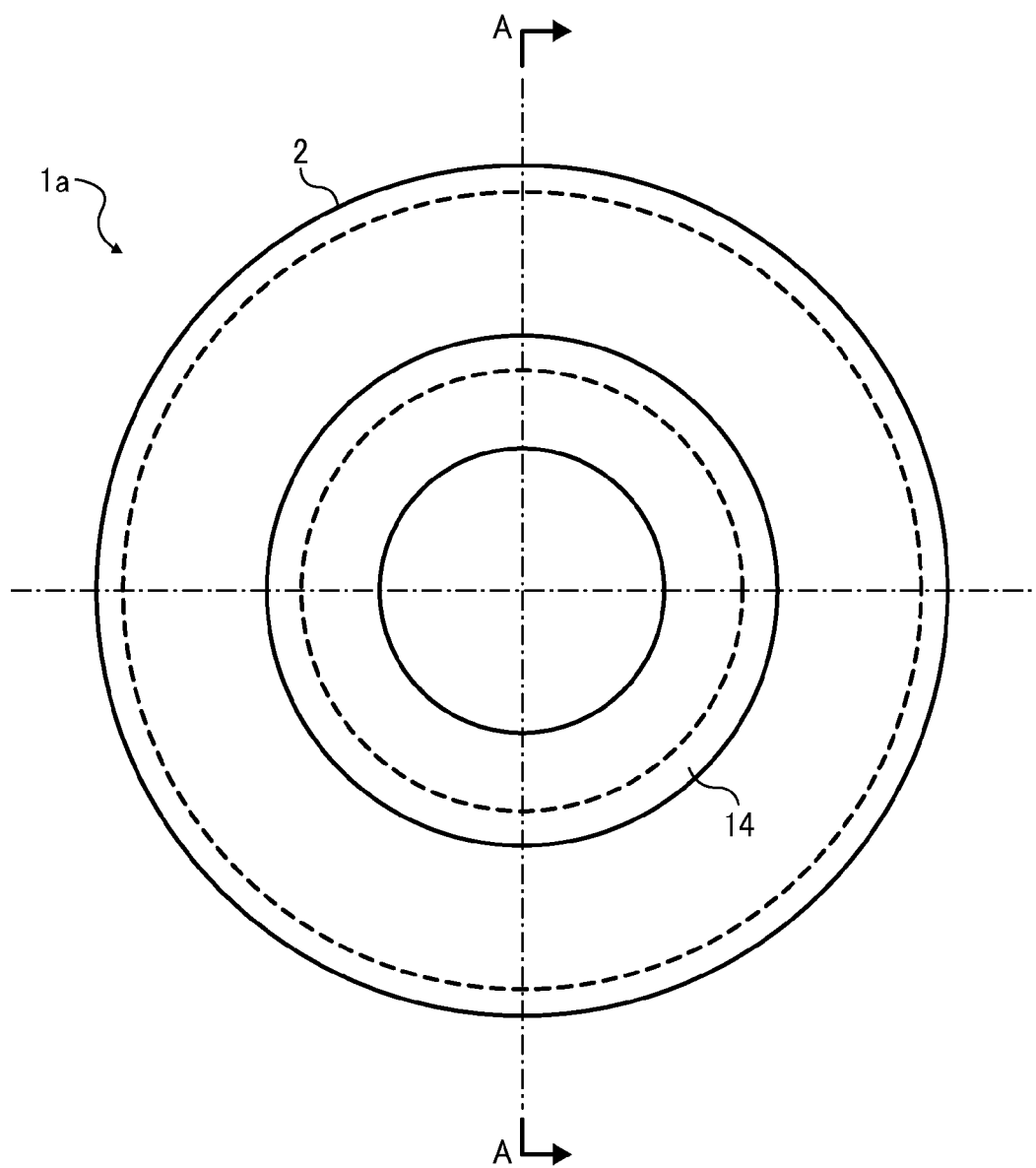
FIG. 6 is a schematic front view of a light source unit according to a second example embodiment.
Figure 7:
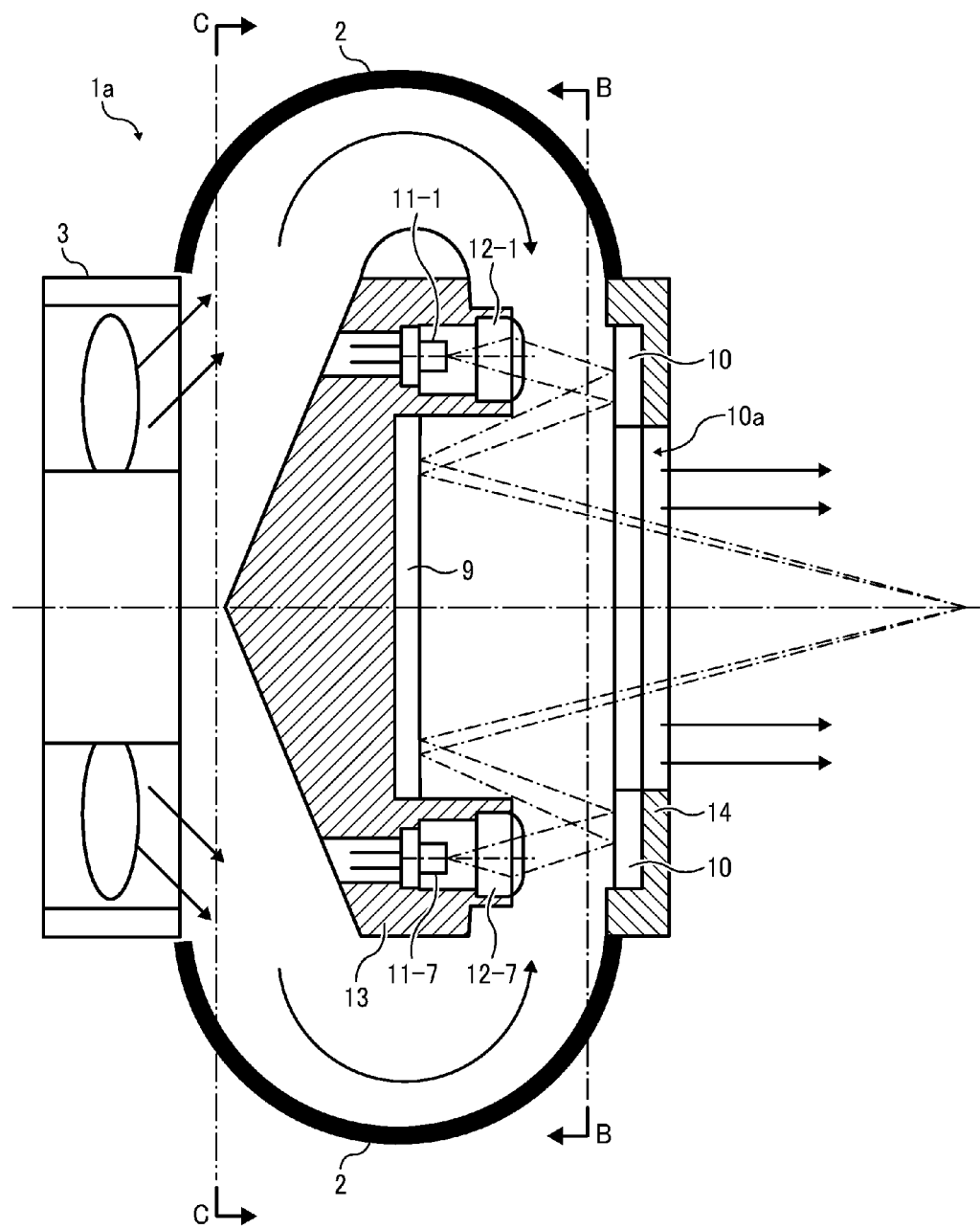
FIG. 7 is a schematic cross-sectional view of the light source unit of FIG. 6 cut at a line A-A in FIG. 6.
Figure 8:
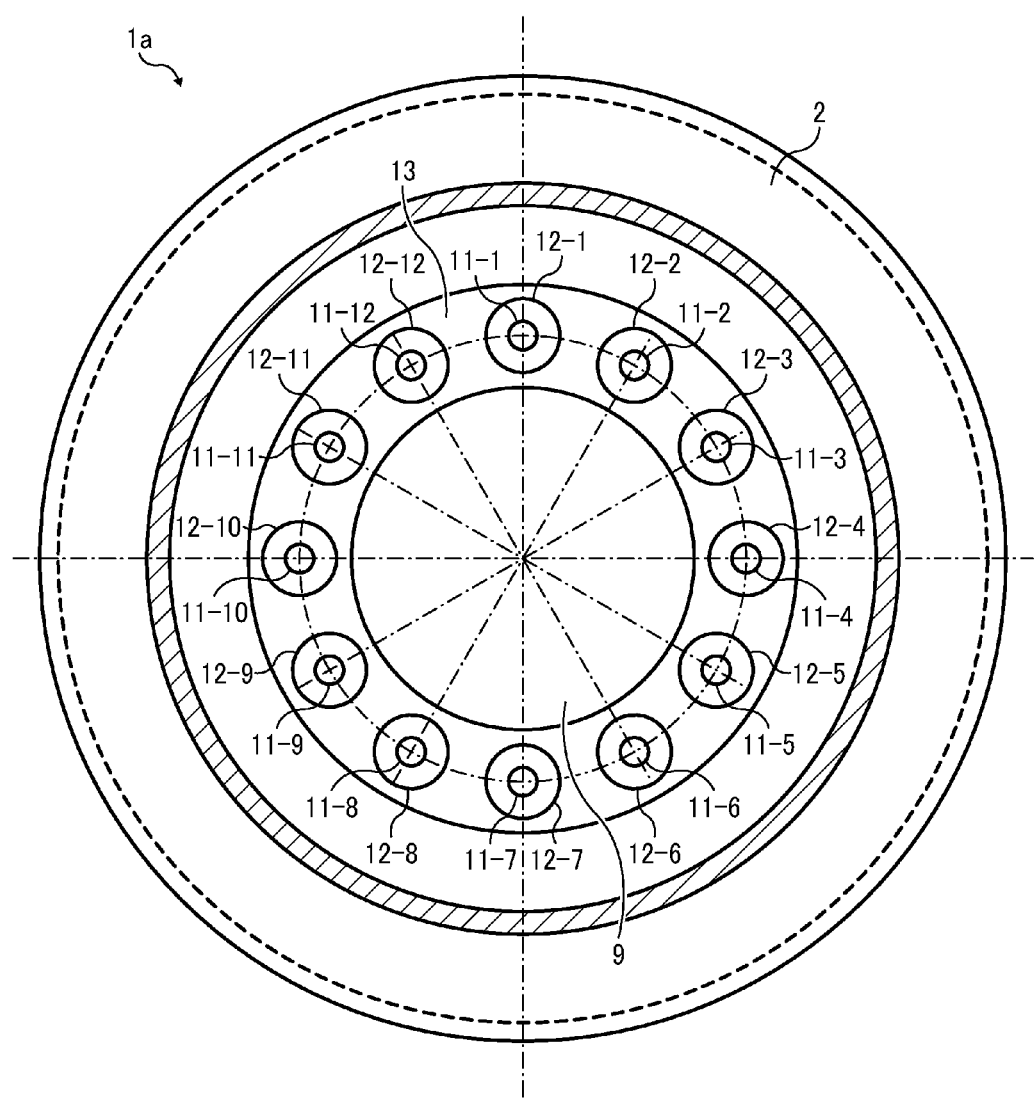
FIG. 8 is a schematic cross-sectional view of the light source unit of FIG. 6 cut at a line B-B in FIG. 7.
Figure 9:
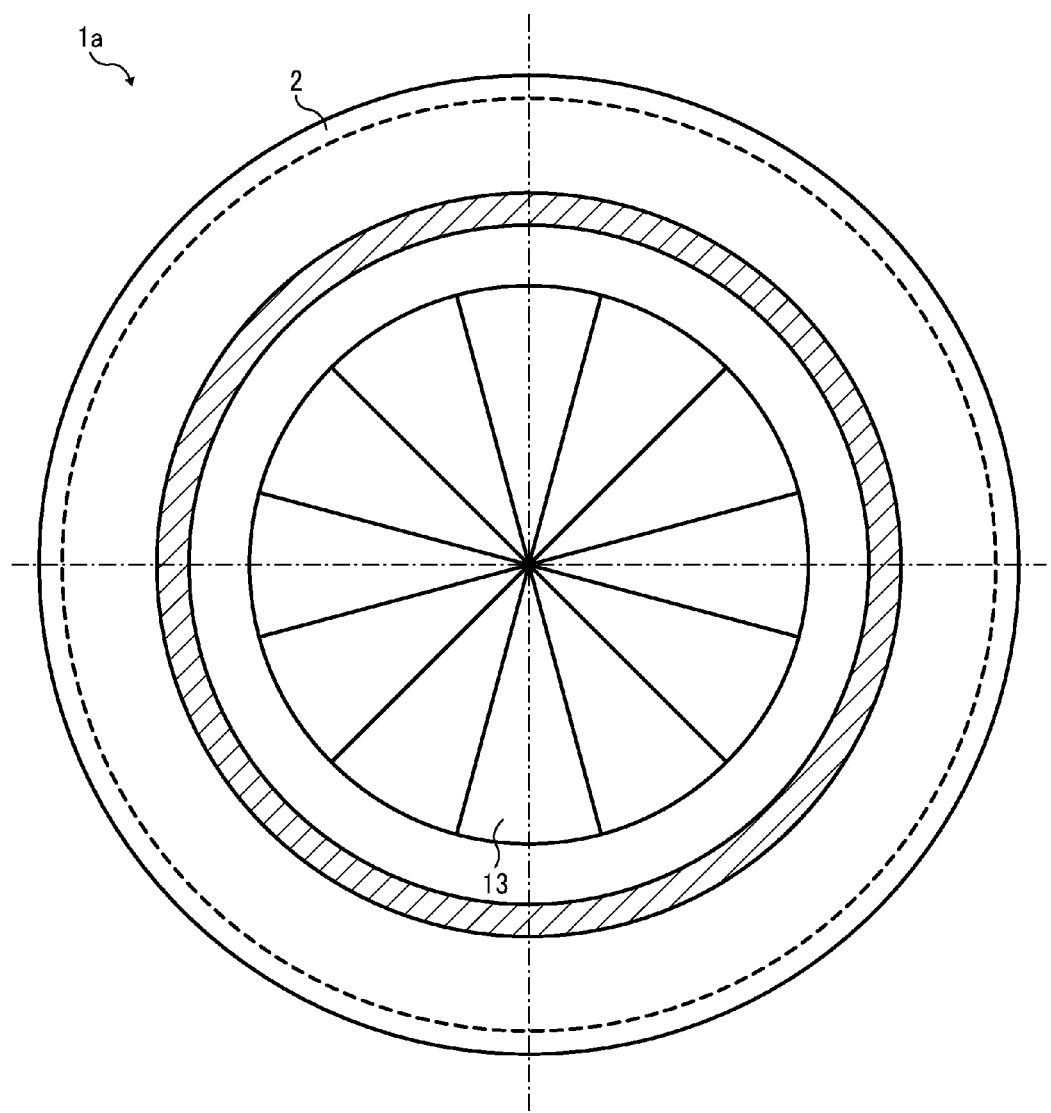
FIG. 9 is a schematic cross-sectional view of the light source unit of FIG. 6 cut at a line C-C in FIG. 7.

FIG. 6 is a schematic front view of the light source unit 1a, useable as a light source unit of the second example embodiment. FIG. 7 is a schematic cross-sectional view of the light source unit 1a cut at a line A-A in FIG. 6. FIG. 8 is a schematic cross-sectional view of the light source unit 1a cut at a line B-B in FIG. 7. FIG. 9 is a schematic cross-sectional view of the light source unit 1a cut at a line C-C in FIG. 7.

The light source unit 1a of the second example embodiment includes the light source supporter 13, having a disc-like shape, that supports the plurality of light sources 11-1 to 11-12 and the plurality of coupling lenses 12-1 to 12-12. Further, in the light source unit 1a of the second example embodiment, the flow path defining member 2 is disposed along the outer periphery of the light source supporter 13 to cover the light source supporter 13. With this configuration, the roundabout flow path is formed along the outer periphery the light source supporter 13 entirely in the second example embodiment.

In the second example embodiment, cooling air blown to the rear face of the light source supporter 13 from the axial flow fan 3 flows along the rear face of the light source supporter 13 to the outer periphery of the light source supporter 13, and then flows through the roundabout flow path disposed at the sides of the light source supporter 13, and then the cooling air is supplied to the front side of the light source supporter 13.

In the second example embodiment, a shape of the rear face of the light source supporter 13 blown with the cooling air the axial flow fan 3 has a slanted portion 4 (see upper and lower side in FIG. 2) to decrease gas flow resistance. Specifically, the rear face of the light source supporter 13 can be a poly-pyramid shape in which slopes are formed radially from the center to the outer periphery of the light source supporter 13. With this configuration, a decrease of flow rate of the cooling air flowing along the rear face of the light source supporter 13 can be suppressed.

The cooling air flowing toward the outer periphery of the light source supporter 13 takes heat from the rear face of the light source supporter 13 and then flows to the roundabout flow path. Then, the cooling air flows to the front side of the light source supporter 13 via the roundabout flow path, and flows in a space between the front side of the light source supporter 13 and the second reflection mirror 10. In the second example embodiment, the light exit port 10a disposed at the center portion the second reflection mirror 10 is an opening or a through hole, and the cooling air flowing into the space is ejected from the light exit port 10a to the outside of the light source unit 1.

Similar to the first example embodiment, in the second example embodiment, the light source supporter 13, the unit side wall 8 and the mirror supporter 14 may configure a light source casing of the light source unit 1, wherein the light source supporter 13 supports the plurality of light sources 11-1 to 11-12 and the plurality of coupling lenses 12-1 to 12-12, the unit side wall 8 and the mirror supporter 14 support the second reflection mirror 10. Typically, it is preferable that the light source casing has openings communicating with external environment as little as possible to prevent intrusion of foreign particles such as dust from air. Therefore, in usual cases, the exit port of light such as the light exit port 10a of the second reflection mirror 10 may be covered by a translucent member such as glass that can pass through light.

However, in the second example embodiment, the translucent member is not disposed the light exit port 10a of the light source unit 1a, but the light exit port 10 is set as opening. With this configuration, the cooling air supplied from the rear side of the light source supporter 13 to the front side of the light source supporter 13 by passing through the roundabout flow path can be ejected outside the light source unit 1a from the light exit port 10a. If the translucent member is disposed at the light exit port 10a, another opening or hole is required to be formed for the light source casing to eject the cooling air efficiently from the light source casing, in which rigidity of the light source casing decreases.

In the second example embodiment, an opening such as the light exit port 10a is used as an ejection port of cooling air, with which a greater cooling air ejection port can be secured without decreasing the rigidity of the light source casing. With this configuration, the cooling air can be ejected from the light source casing efficiently, with which cooling performance of cooling air can be maintained at a higher level. Further, when the light exit port 10a (i.e. opening in the second example embodiment) is used as the cooling air ejection port, a strong blow of cooling air from the inside to the outside of the light source casing occurs at the light exit port 10a. With this configuration, even if the light exit port 10a is the opening as above described, foreign particles such as dust may not intrude inside the light source casing easily, with which intrusion of foreign particles inside the light source casing may become little.

Third Example Embodiment

A description is given of a third example embodiment of a light source unit. A light source unit 1b of the third example embodiment has a configuration almost same as the light source unit 1a of the above first example embodiment, but compared to the light source unit 1a of the first example embodiment, a heat dissipater such as a heat sink 15 is further disposed to enhance cooling performance. A description is given of a different point of the light source unit 1b of the third example embodiment compared to the light source unit 1a of the first example embodiment.

Figure 10:
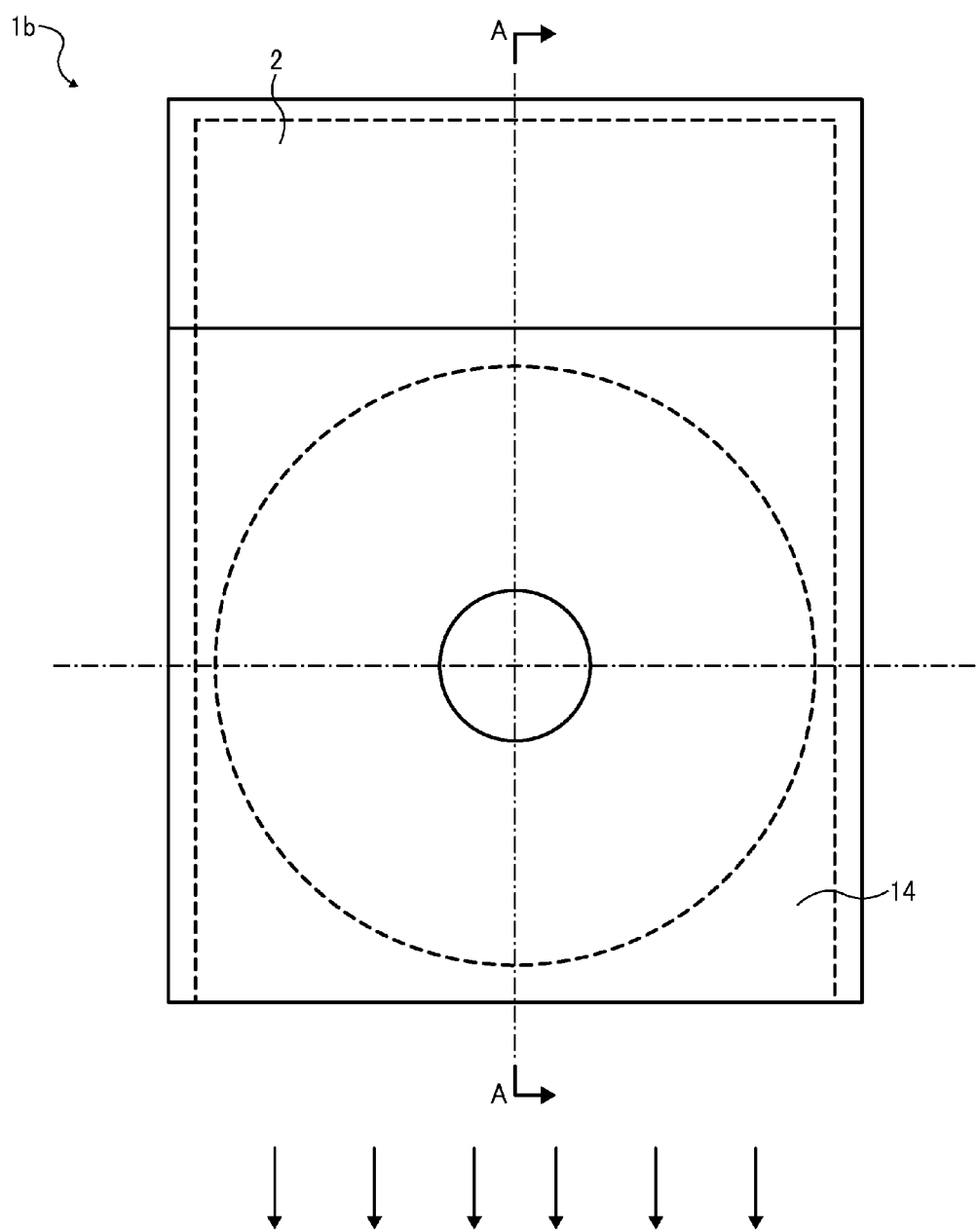
FIG. 10 is a schematic front view of a light source unit according to a third example embodiment.
Figure 11:
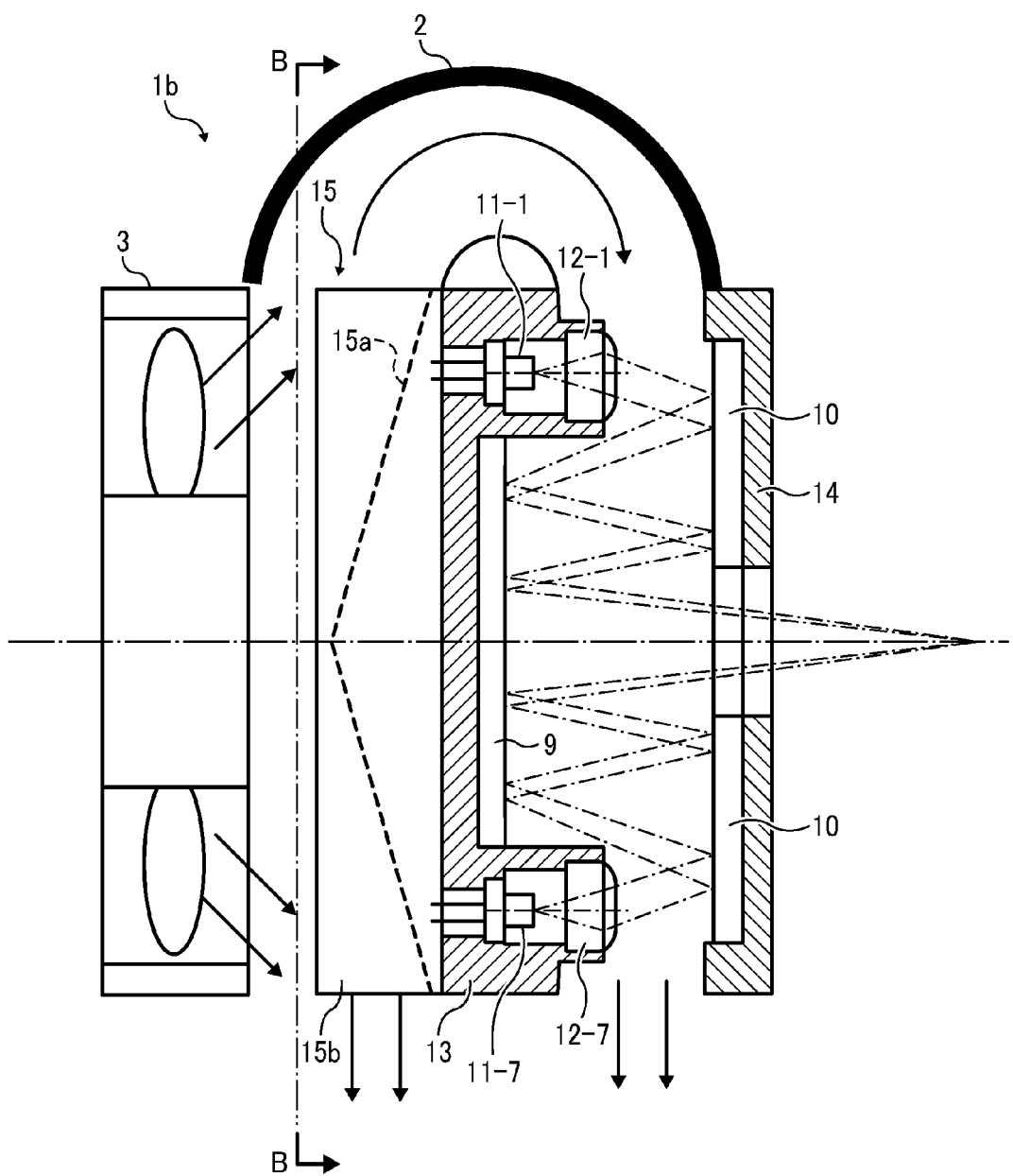
FIG. 11 is a schematic cross-sectional view of the light source unit of FIG. 10 cut at a line A-A in FIG. 10.
Figure 12:
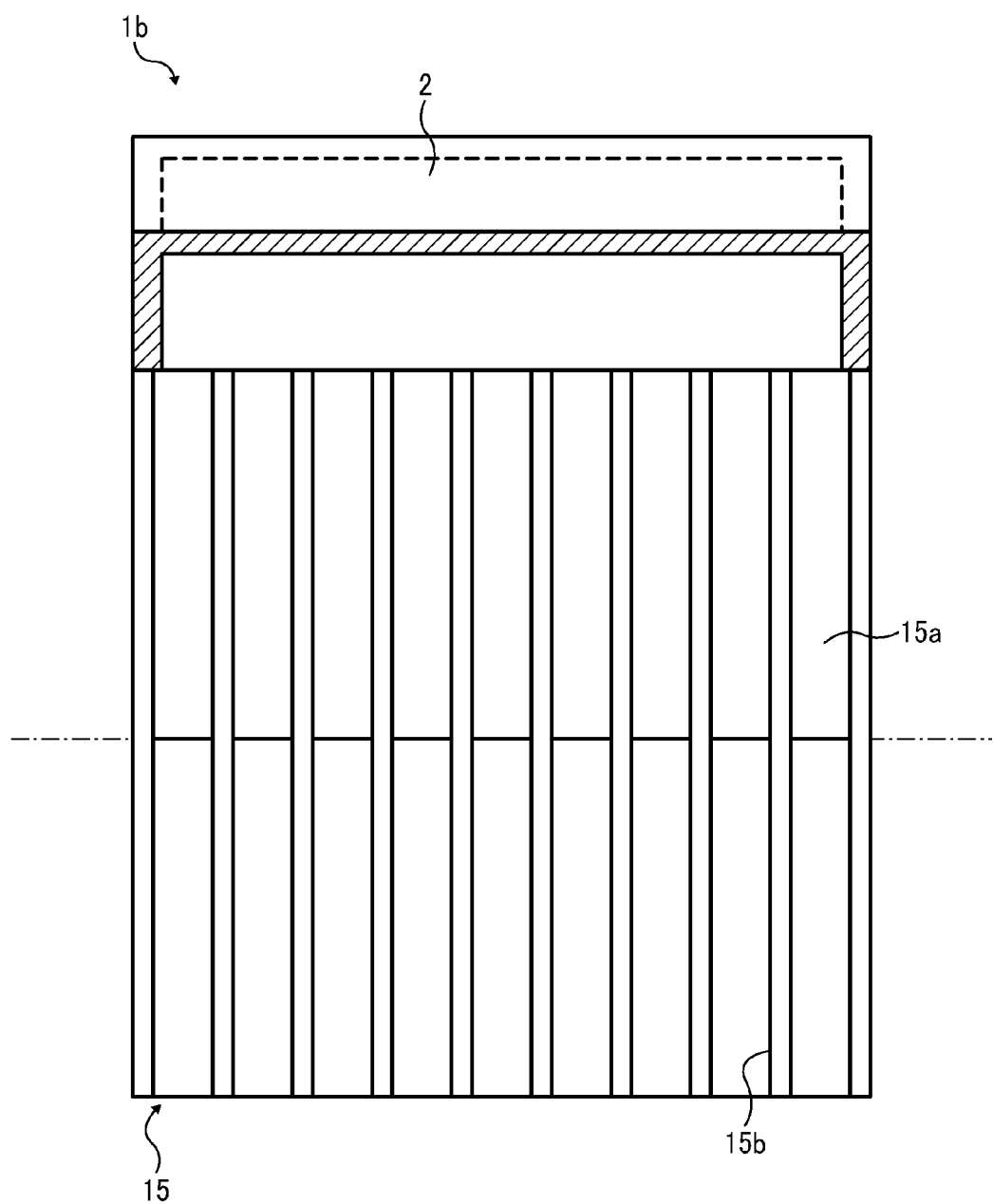
FIG. 12 is a schematic view of a heat sink of the light source unit of FIG. 10 viewed from a rear side of a light source supporter.

FIG. 10 is a schematic front view of the light source unit 1b useable as a light source apparatus of the third example embodiment. FIG. 11 is a schematic cross-sectional view of the light source unit 1b cut at a line A-A in FIG. 10. FIG. 12 is a schematic view of the heat sink 15 of the light source unit 1b viewed from a rear side of the light source supporter 13. As shown in FIG. 11, as to the light source unit 1b of the third example embodiment, the rear face of the light source supporter 13 is formed as a flat face, and the heat sink 15 is attached to the rear face of the light source supporter 13. The heat sink 15 includes, for example, a base 15a and plate fins 15b. The base 15a is attached and contacted to the entire rear face of the light source supporter 13, and a number of the plate fins 15b extend from the base 15a.

In the third example embodiment, as shown in FIG. 11, a shape of the base 15a of the heat sink 15 is formed as a slanted shape toward the sides of the light source supporter 13 (e.g., upper and lower sides of FIG. 11) to decrease gas flow resistance of the cooling air blown from the axial flow fan 3, in which a cross-sectional shape of the light source supporter 13 may become a wedge shape, which may be referred to as the slanted portion. With this configuration, a decrease of flow rate of the cooling air blown to the heat sink 15 attached to the rear face of the light source supporter 13 and then flowing through gaps of the plate fins 15b toward the sides of the light source supporter 13 (e.g., upper and lower sides in FIG. 11) can be suppressed.

In the third example embodiment, the cooling air supplied from the axial flow fan 3 is blown to the heat sink 15 attached to the rear face of the light source supporter 13, and then the cooling air flows to the sides of the light source supporter 13 through gaps of the plate fins 15b, in which the cooling air efficiently takes heat from the heat sink 15, which is transmitted heat from the light sources 11-1 to 11-12 on the light source supporter 13 via the light source supporter 13, with which cooling performance of the light sources 11-1 to 11-12 on the light source supporter 13 can be enhanced.

Fourth Example Embodiment

A description is given of a fourth example embodiment of a light source unit. A light source unit 1c of the fourth example embodiment has a configuration almost same as the light source unit 1a of the second example embodiment, but compared to the light source unit 1a of the second example embodiment, a heat dissipater such as a heat sink 15 is further disposed to enhance cooling performance. A description is given of a different point of the light source unit 1c of the fourth example embodiment compared to the light source unit 1a of the second example embodiment.

Figure 13:
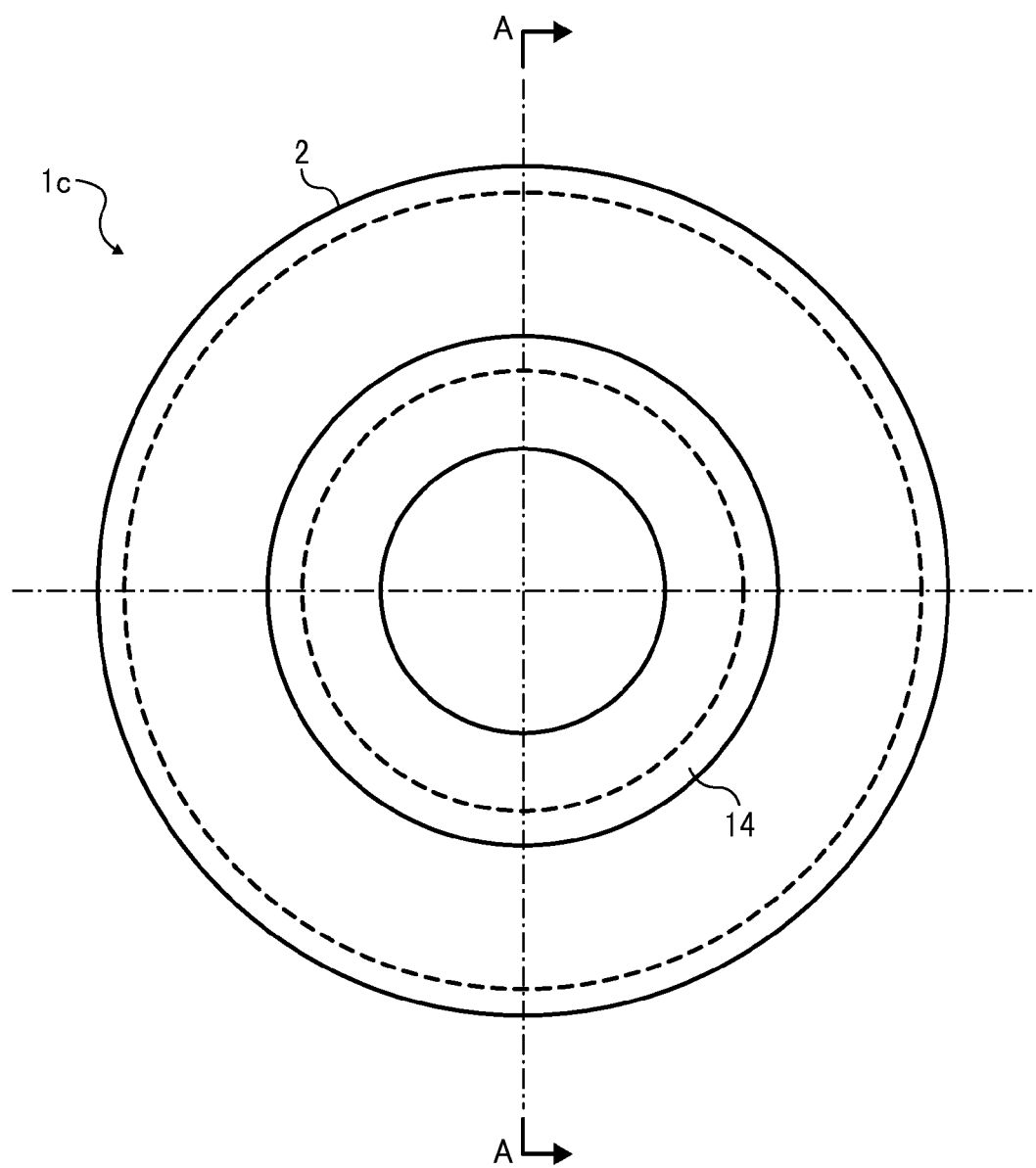
FIG. 13 is a schematic front view of a light source unit according to a fourth example embodiment.
Figure 14:
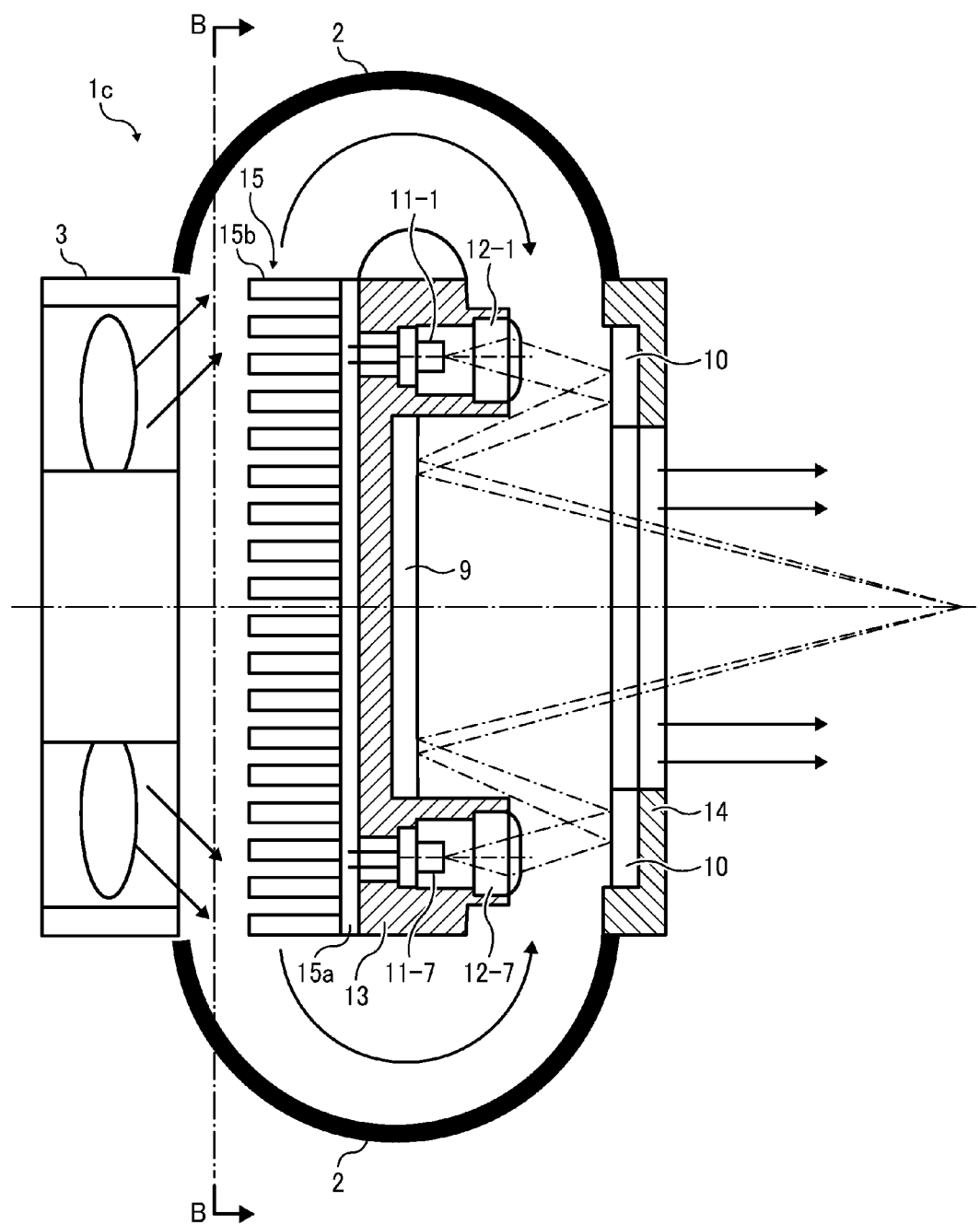
FIG. 14 is a schematic cross-sectional view of the light source unit of FIG. 13 cut at a line A-A in FIG. 13.
Figure 15:
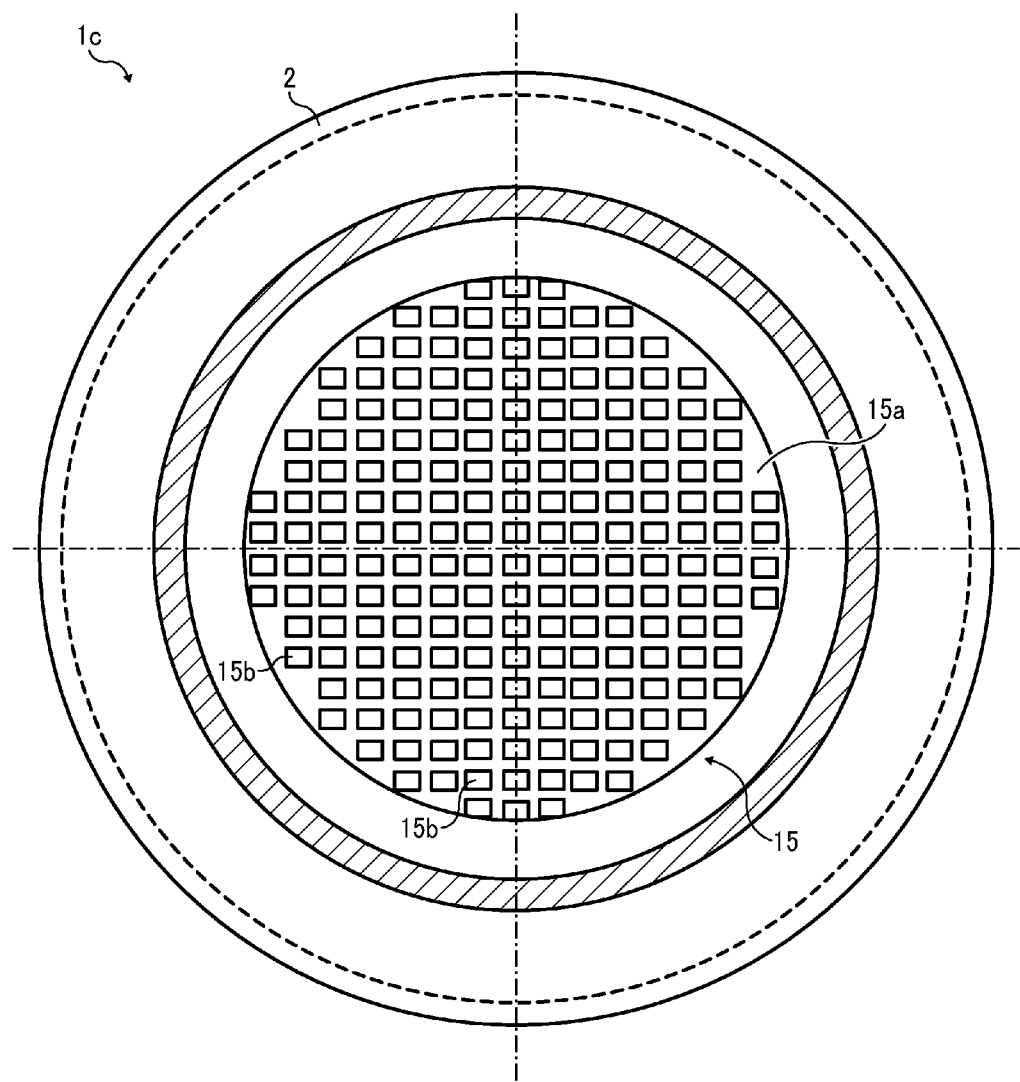
FIG. 15 is a schematic view of a heat sink of the light source unit of FIG. 13 viewed from a rear side of a light source supporter.

FIG. 13 is a schematic front view of the light source unit 1c useable as a light source unit of the fourth example embodiment. FIG. 14 is a schematic cross-sectional view of the light source unit 1c cut at a line A-A in FIG. 13. FIG. 15 is a schematic view of the heat sink 15 of the light source unit 1c viewed from a rear side of the light source supporter 13. As shown in FIG. 14, as to the light source unit 1c of the fourth example embodiment, the rear face of the light source supporter 13 is formed as a flat face, and the heat sink 15 is attached to the rear face of the light source supporter 13. The heat sink 15 includes, for example, a base 15a and rod fins 15b. The base 15a is attached and contacted to the entire rear face of the light source supporter 13, and a number of the rod fins 15b extend from the base 15a.

Similar to the second example embodiment, in the light source unit 1c of the fourth example embodiment, the light source supporter 13 is formed as a disc-like shape, and the flow path defining member 2 is disposed to cover the outer periphery of the light source supporter 13. With this configuration, in the fourth example embodiment, the roundabout flow path is defined for the entire outer periphery of the light source supporter 13.

In the fourth example embodiment, the heat sink 15 having a number of rod fins 15b at dispersed positions is used to radially flow the cooling air blown from the axial flow fan 3 to the outer periphery of the light source supporter 13. With this configuration, the cooling air blown from the axial flow fan 3 can be evenly dispersed toward the outer periphery of the light source supporter 13.

In the fourth example embodiment, the cooling air from the axial flow fan 3 is blown to the heat sink 15 attached to the rear face of the light source supporter 13, and then the cooling air flows to the outer periphery of the light source supporter 13 through gaps of the rod fins 15b, in which the cooling air efficiently takes heat from the heat sink 15, which is transmitted heat from the light sources 11-1 to 11-12 on the light source supporter 13 via the light source supporter 13, with which cooling performance of the light sources 11-1 to 11-12 on the light source supporter 13 can be enhanced.

(Image Projection Apparatus)

A description is given of an image projection apparatus such as a projector employing one or more of the above described example embodiments of light source units.

FIG. 16 is a schematic configuration of an image projection apparatus 20 of the fifth example embodiment. The image projection apparatus 20 includes, for example, the light source unit 1c, a rod integrator 16, a relay lens 17, an image generation panel 18 and a projection lens 19. The rod integrator 16, the relay lens 17 and the image generation panel 18 collectively configure a light-transmission optical system, and the projection lens 19 configures a projection optical system. The rod integrator 16 is used as a light quantity equalizing unit. The relay lens 17 is used as a light transmission optical system to transmit light, being equalized its light quantity by the rod integrator 16, to the image generation panel 18 used as an image generator. The projection lens 19 is used as the projection optical system to enlarge and project an image generated by the image generation panel 18.

The light beams emitted from the light sources 11-1 to 11-12 are condensed and then exit from the light source unit 1c as a light beam flux. Specifically, the light beam flux enters the rod integrator 16, which equalizes light quantity of light beams emitted from the light sources 11-1 to 11-12. The rod integrator 16 synthesizes color and equalizes the light quantity while the light beam flux repeats the total reflection in the rod integrator 16, and then the light exits from the rod integrator 16. The light exiting from the rod integrator 16 enters the relay lens 17, and then radiates the image generation panel 18. Then, an image is projected onto a screen using the projection lens 19.

In the image projection apparatus 20, the image generation panel 18 may be a pass-through type panel that generates images based on modulation signals, but other devices such as a reflection type panel or a micro-mirror device panel such as digital micro-mirror device (DMD) can be used. Further, the rod integrator 16 is an example of the light intensity equalizing unit, and other light intensity equalizing units can be used. Further, the relay lens 17 and the projection lens 19 are not limited above example embodiment.

By employing the above described light source unit described in the above example embodiments for the image projection apparatus 20, the light beams emitted from a plurality of light sources can be synthesized as the light beam flux having high light intensity and reduced cross-section area, and the incidence angle to the rod integrator 16 can become smaller. Therefore, an area of the light radiating on the image generation panel 18 can be reduced, by which the projection lens 19 having a smaller numerical aperture (NA), which means a greater F-number lens, can be used. Therefore, the projection lens 19 can be designed and manufactured easily, and imaging performance can be maintained at a good enough level easily. As such, the image projection apparatus 20 can use a plurality of light sources while enhancing the heat dissipation performance and the performance of equalizing the light intensity.

Further, by reducing the cross-section area of light beam flux exiting from the light source unit, the light focus distance of the exiting light beam flux can be shortened, with which the rod integrator 16 can be disposed further closer to the light source unit and the image projection apparatus 20 can be designed in compact in size in the light exiting direction of the light source unit.

In the above described example embodiments, the light sources 11-1 to 11-12 are arranged in the circle pattern two dimensionally, but the configuration is not limited hereto. For example, when the light sources are arranged two dimensionally with a dispersed pattern, the light sources can be arranged in a lattice pattern, a polygonal pattern, or the like. The light sources can be arranged with an even pitch between the light sources or can be arranged with an uneven pitch between the light sources.

The above described example embodiment of the light source unit may have following features.

In the above described one or more of light source units, the light source unit includes a light emitting element supporter such as the light source supporter 13 to support a plurality of light emitting elements such as the light sources 11-1 to 11-12 disposed with a dispersed pattern in a two-dimensional direction as a light emitting element assembly, and light emitted from the light emitting element assembly exits to a target such as the rod integrator 16. The light return member such as the second reflection mirror 10 is disposed at a light emitting side of the light emitting element assembly while setting a space with the light emitting element supporter, the light return member returns light emitted from the light emitting element assembly toward at an inner side of two dimensional direction side of the light emitting element assembly, and a flow path of the cooling air is formed to pass through cooling air supplied from an air supply unit such as the axial flow fan 3 into the space. The space between the light emitting element supporter and the light-return device is close to the light emitting side of the light emitting element assembly, with which heat from each of the light emitting elements is easily transferred to the space, and therefore temperature of the space may increase easily. Further, because this space is a narrow space between the light emitting element supporter and the light-return device, heat may accumulate easily. Therefore, temperature of the light-return device close to this space may increase easily, and optical properties of the light-return device may change due to heat. In the above described one or more of light source units, the heat in this space can be removed by the cooling air, this cooling air can cool both of the light emitting element assembly on the t emitting element supporter, and the light-return device efficiently In the above described one or more of light source units, a light guide member such as the first reflection mirror 9 is disposed at an inner side of two dimensional direction of the light emitting element assembly to guide light, which has entered the light guide member, to a light exiting direction of the light source unit, and the light return member returns the light emitted from the light emitting element assembly to the light guide member. With this configuration, the cross section area of the light flux emitted from the light emitting element assembly can be decreased, and density increased light flux can exit from the light source unit. Further, by reducing the cross section area of the light flux exiting from the light source unit, a light focus distance of the exiting light beam flux can be shortened, with which a projector including the light source unit can be compact in size in the light exiting direction of the light source unit.

In the above described one or more of light source units, the light source unit includes an air supply unit such as the axial flow fan 3 to supply the cooling air to a rear side of the light emitting side of the light emitting element assembly. The flow path includes a roundabout flow path, formed at a peripheral side of the light emitting element supporter, to guide the cooling air supplied by the air supply unit toward the light emitting side of the light emitting element assembly, and the cooling air supplied from the roundabout flow path passes through the space. With this configuration, the air supply unit can be disposed at the rear side of the light emitting side of the light emitting element assembly, with which saving of space of the light source unit can be enhanced.

In the above described one or more of light source units, the rear side of the light emitting side of the light emitting element assembly in the light emitting element supporter includes a slanted portion such as the rear face of the light source supporter 13 or the base 15a of the heat sink 15 to guide cooling air supplied by the air supply unit toward the roundabout flow path. With this configuration, a decrease of flow rate of the cooling air supplied by the air supply unit can be suppressed, and the cooling air can be supplied to the roundabout flow path, with which cooling performance of cooling air can be maintained at a higher level.

In the above described one or more of light source units, a heat dissipater such as the heat sink 15 disposed at the rear side of the light emitting side of the light emitting element assembly in the light emitting element supporter. The heat dissipater dissipates heat from the light emitting element assembly, and the heat dissipater includes the slanted portion. With this configuration, even if the heat dissipater 15 is disposed to obtain a higher cooling performance, a decrease of flow rate of the cooling air supplied by the air supply unit can be suppressed, and the cooling air can be supplied to the roundabout flow path, with which cooling performance of cooling air can be maintained at a higher level.

In the above described one or more of light source units, the flow path is formed to guide cooling air supplied from the roundabout flow path to the space and then to pass through the cooling air in the space, and then to eject the cooling air from a side opposite to a side of the light emitting element supporter formed with the roundabout flow path. With this configuration, without changing a flow direction of the cooling air guided to the space from the roundabout flow path too much, the cooling air can be passed through the space, with which a higher cooling performance can be maintained.

In the above described one or more of light source units, the light source unit includes a light source casing to encase the light emitting element supporter and the light emitting element assembly, and a light exit port 10a is opened for the light source casing, from which light emitted from the light emitting element assembly exits, and the cooling air that has passed through the ventilating hole 2 is ejectable outside the light source casing through the light exit port.

With this configuration, without decreasing rigidity of the light source casing, a cooling air ejection port having a broader area can be secured, with which cooling air can be efficiently ejected from the light source casing, and cooling performance by the cooling air can be maintained at a higher level. Further, when the light exit port 10a (i.e., opening) is used as the cooling air ejection port, a strong blow of cooling air from the inside to the outside of the light source casing occurs at the light exit port 10a. With this configuration, even if the light exit port 10a is the opening as above described, foreign particles such as dust may not intrude inside the light source casing easily, with which intrusion of foreign particles inside the light source casing may become little.

An image projection apparatus such as the image projection apparatus 20 can use the above described one or more of light source units, with a light-transmission optical system to guide light emitted from the light source unit to an image generator, and a projection optical system to enlarge and project an image generated by the image generator. With this configuration, the effects of the above described image projection apparatus can be obtained.

In the above described one or more of light source units, the light emitting element assembly and the light-return device can be cooled efficiently, wherein the light emitting element assembly is composed of the light emitting elements arranged in the two-dimensional direction, and the light-return device returns light emitted from the light emitting element assembly to an inner side of two dimensional direction of light emitting element assembly. Specifically, cooling air can pass through the space between the light-return device and the light emitting element supporter, wherein the light emitting element supporter exists at the light emitting side of the light emitting element assembly, and this cooling air can take heat from the space. With this configuration, both of the light emitting element assembly on the light emitting element supporter and the light-return device can be cooled efficiently using the cooling air.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A light source unit, comprising:
a plurality of light emitting elements disposed with a dispersed pattern in a two-dimensional direction to together form a light emitting element assembly, the light emitting element assembly being configured to emit light to a target;
a light emitting element supporter disposed rearward of the plurality of light emitting elements in a light emitting direction, the light emitting element supporter being configured to support the plurality of light emitting elements of the light emitting element assembly;
a light return member, having an opening therein, disposed outside of the light emitting element supporter and at a position facing a light emitting side of the light emitting element assembly while setting a space with the light emitting element supporter, and configured to return light emitted from the light emitting element assembly toward at an inner side of two dimensional direction of the light emitting element assembly;
an air supply unit disposed rearward of the light emitting element supporter in the light emitting direction; and
a flow path defining member that connects the air supply unit and the light return member, the flow path defining member having a curved shape that encases at least a portion of the light emitting element assembly,
wherein cooling air supplied from the air supply unit passes through a flow path defined by a wall of the flow path defining member and a surface of the light emitting element assembly into the space formed by the light return member with the light emitting element supporter, and wherein the light emitting element supporter has a rear side facing the air supply unit.

2. The light source unit of claim 1, further comprising:
a reflective light guide member disposed at an inner side of two dimensional direction of the light emitting element assembly to guide light, which has entered the light guide member to a light exiting direction of the light source unit,
wherein the light return member returns the light emitted from the light emitting element assembly to the reflective light guide member.

3. The light source unit of claim 2, wherein the reflective light guide member is in a recess formed in a surface of the light emitting element supporter facing the opening in the light return member.

4. The light source unit of claim 1, wherein the air supply unit supplies the cooling air to the rear side of the light emitting side of the light emitting element assembly, and
wherein the flow path includes a roundabout flow path, the roundabout flow path formed at a non-light transmitting side of the light emitting element supporter and the flow path defining unit to guide the cooling air supplied by the air supply unit toward the light emitting side of the light emitting element assembly, and the cooling air supplied from the roundabout flow path passes through the space.

5. The light source unit of claim 4, wherein the rear side of the light emitting side guides cooling air supplied by the air supply unit toward the roundabout flow path.

6. The light source unit of claim 4, wherein the flow path is formed to guide cooling air supplied from the roundabout flow path to the space and then to pass through the cooling air in the space, and then to eject the cooling air from a side opposite to a side of the light emitting element supporter formed with the roundabout flow path.

7. The light source unit of claim 4, wherein the rear side of the light emitting element supporter has a poly-pyramid shape which slopes radially from a center to the peripheral edge of the light emitting element supporter.

8. The light source unit of claim 1, further comprising
a heat dissipater disposed at the rear side of the light emitting side of the light emitting element assembly in the light emitting element supporter.

9. The light source unit of claim 1, further comprising:
a light source casing to encase the light emitting element supporter and the light emitting element assembly,
wherein the light source casing includes a light exit port, from which light emitted from the light emitting element assembly exits, wherein the cooling air that has passed through the space is ejectable outside the light source casing through the light exit port.

10. An image projection apparatus, comprising:
the light source unit of claim 1;
a light-transmission optical system to guide light emitted from the light source unit to an image generator; and
a projection optical system to enlarge and project an image formed by the image generator.

11. The light source unit of claim 1, wherein the flow path defining member has an arcuate surface that extends between side walls of the light source unit.

12. The light source unit of claim 1, wherein the peripheral edge of the light emitting element supporter has an arcuate shape and forms a portion of the flow path.

* * * * *